United States Patent

Osoegawa et al.

[15] 3,673,478

[45] June 27, 1972

[54] SEMICONDUCTOR PELLET FITTED ON A METAL BODY

[72] Inventors: Hideru Osoegawa, Kodaira-shi; Katuei Kobayashi, Tokyo, both of Japan

[73] Assignee: Hitachi, Ltd., Tokyo, Japan

[22] Filed: Oct. 31, 1969

[21] Appl. No.: 871,802

Related U.S. Application Data

[62] Division of Ser. No. 763,201, Sept. 27, 1968.

[52] U.S. Cl. .....................317/234 R, 317/234 M, 317/234 L
[51] Int. Cl. .........................................................H01l 3/00
[58] Field of Search.................................................317/234

[56] References Cited

UNITED STATES PATENTS

| | | | |
|---|---|---|---|
| 3,555,669 | 1/1971 | Tarn | 29/589 |
| 3,323,957 | 6/1967 | Rose et al. | 148/177 |
| 3,323,956 | 6/1967 | Gee | 148/177 |
| 3,280,387 | 10/1966 | Emeis | 317/234 |
| 3,160,798 | 12/1964 | Lootens et al. | 317/234 |
| 3,172,829 | 3/1965 | Bakker et al. | 204/35 |
| 3,393,091 | 7/1968 | Hartman et al. | 117/217 |

*Primary Examiner*—John W. Huckert
*Assistant Examiner*—E. Wojciechowicz
*Attorney*—Craig, Antonelli and Hill

[57] ABSTRACT

A semiconductor device which includes a metal lead, a metal foil of gold or the like connected with the metal lead by way of a first intermediate alloy layer which is formed between the metal lead and the metal foil, and a semiconductor pellet fixed to the metal foil with a second intermediate alloy layer formed between the semiconductor material and the metal foil.

7 Claims, 13 Drawing Figures

Figure 1A:
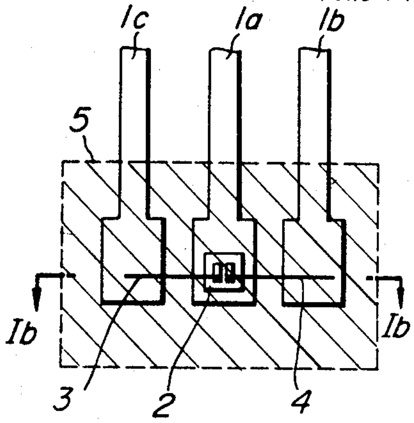
FIG. 1a PRIOR ART

INVENTORS
HIDERU OSOEGAWA
KATUEI KOBAYASHI

BY Craig, Antonelli, Stewart & Hill

ATTORNEYS

INVENTOR

HIDERU OSOEGAWA

KATUEI KOBAYASHI

BY Craig, Antonelli, Stewart & Hill

ATTORNEYS

INVENTORS
HIDERU OSOEGAWA
KATUEI KOBAYASHI
BY Craig, Antonelli, Stewart & Hill
ATTORNEYS

SEMICONDUCTOR PELLET FITTED ON A METAL BODY

This is a division of application Ser. No. 763,201, filed Sept. 27, 1968.

This invention relates to a method for manufacturing a semiconductor device, and more particularly to an improved method for fitting a semiconductor pellet on a metal material such as an electrode and a supporting plate.

Generally in the field of manufacturing a semiconductor device, it is conventional to apply the photoetching and impurity diffusion treatments to a semiconductor, e.g., to a silicon wafer, to form a plurality of passive or active elements or semiconductor integrated circuits composed of these elements, and thereafter dividing the wafer into a plurality of pellets containing the elements. Each divided pellet is fitted to an electrode, a metal supporting means, or the bottom surface of a vessel in which the pellet is to be contained. According to a prior art technique, before fitting the pellets to their objects, the electrode, the metal supporting portion, or the bottom of the vessel is preliminarily coated with a plating layer, for example, of gold. It is preferable for the plating layer to have a relatively large thickness in order to obtain a good ohmic contact. Since a thick plating layer is hard to obtain, according to another example a gold foil is disposed on the plating layer so that the silicon pellet may be fitted to its object by means of the gold foil and the gold plating layer. As is well known, gold and silicon form a eutectic alloy at a relatively low temperature (about 377° C.) and easily make ohmic contact. Hence, the above-mentioned methods are suitable for the fitting of a silicon pellet, which is one of the important materials in the manufacture of recent semiconductor devices.

However, gold is very expensive. It is undesirable to use much gold in view of the cost of the devices, which is one of the important requirements in the manufacture of semiconductor devices.

Therefore, one object of this invention is to provide a method for manufacturing an inexpensive semiconductor device by limiting the use of expensive materials, e.g. gold.

Another object of this invention is to provide an improved method for making ohmic contact of a semiconductor pellet on a metal material.

A further object of this invention is to provide a method for easily controlling the fitting position of a semiconductor device on an electrode.

Still another object of this invention is to provide a semiconductor device in which the fitting of elements on the electrodes is firmly and securely done, decreasing the series resistance and dispersion.

Another object of this invention is to improve the electrode fitting of the miniaturized semiconductor elements like transistors, the fitting of connectors to the elements, and the fitting of the connectors to external lead wires.

According to this invention, a contact plate, such as an Au foil is connected preliminarily to a metal material e.g., an electrode or a lead wire, the area of the contact plate being substantially equal to the fitting area of the semiconductor element or the pellet. The contact plate is shaped as a pre-formed body having the above-described area. An alloy layer is formed between the contact plate and the metal material without changing the shape of the pre-formed body, thereby to connect the contact plate with the metal material. Therefore, the connection can be effectively completed by using electric resistance welding. Next the metal material and a portion of the contact plate which has not formed the alloy layer are heated at a temperature lower than the eutectic point of the alloy. The semiconductor pellet is disposed on the contact plate and rubbed so that the pellet and the remaining portion of the contact plate are alloyed.

According to a concrete embodiment of this invention, first an Au-Sb alloy foil is disposed on the surface of a metal material, e.g., nickel or nickel-iron alloy. The foil is alloyed with the metal material except one surface portion thereof. This treatment is preferably done by electric resistance welding. Next a silicon pellet is alloyed with the remaining portion of the foil. In this case the Au-Sb foil and the silicon pellet are heated at about 400° C. to form an Au-Si-Sb eutectic alloy layer.

Figure 1B:
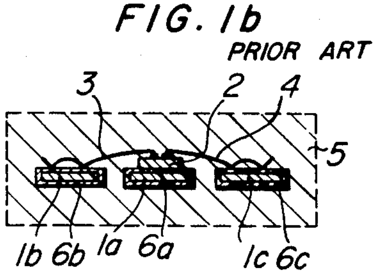
FIG. 1b PRIOR ART

These and other objects and advantages of this invention will be made more apparent from the following explanation of the preferred embodiments of this invention with reference to the accompanying drawings, in which;

FIGS. 1*a* and 1*b* are perspective and cross sectional views of a prior art device.

FIGS. 2*a* to 2*d* are perspective and cross sectional views showing the manufacturing steps of a collector lead body according to this invention.

Figure 3A:
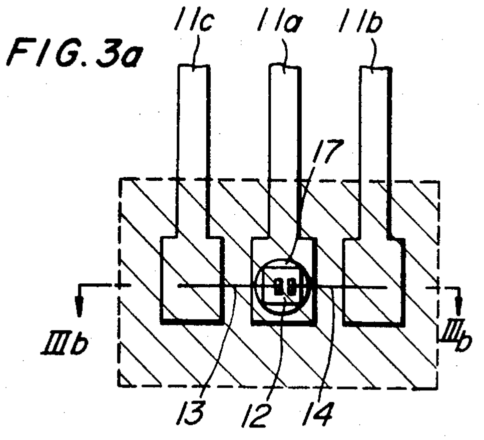
Figure 3B:
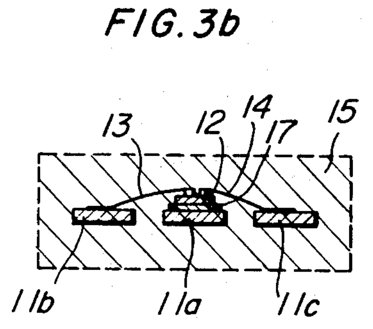

FIGS. 3*a* and 3*b* are perspective and cross sectional views of a semiconductor device obtained by this invention.

Figure 4A:
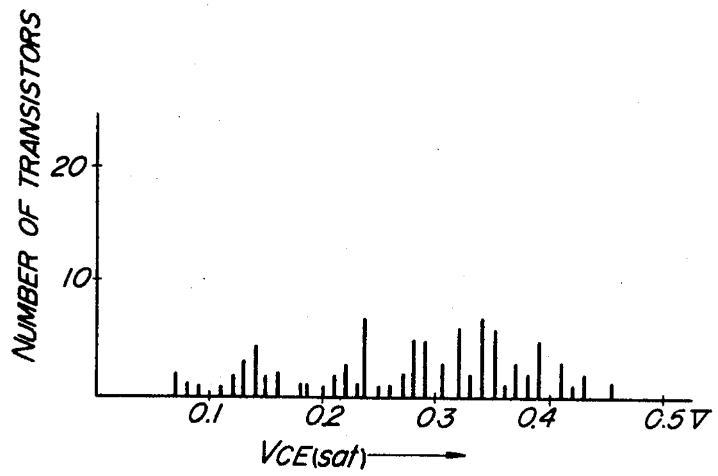
FIG. 4a PRIOR ART
Figure 4B:
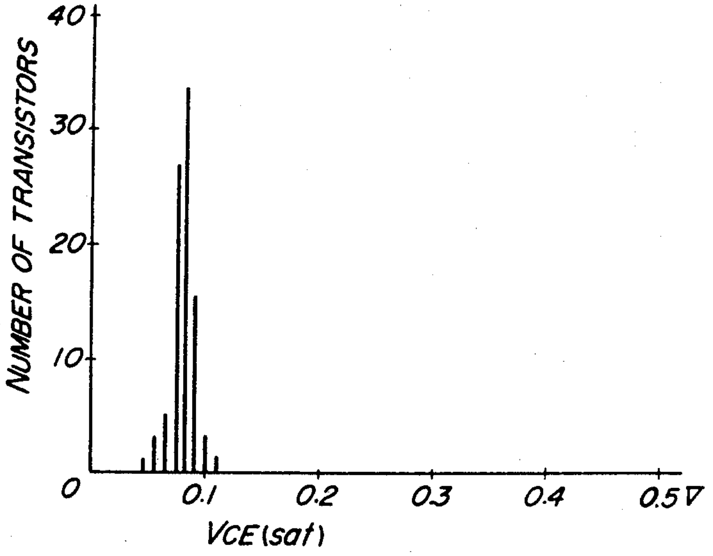

FIGS. 4*a* and 4*b* show the electrical characteristics of the devices according to the prior art and this invention respectively.

Figure 5A:
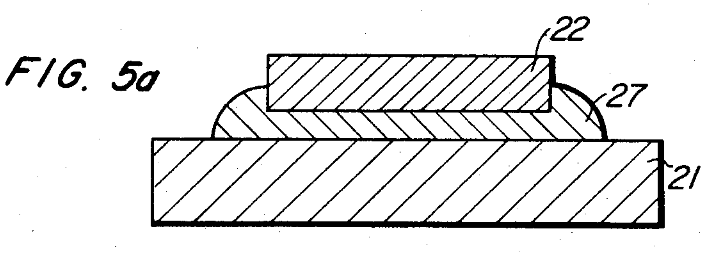
Figure 5B:
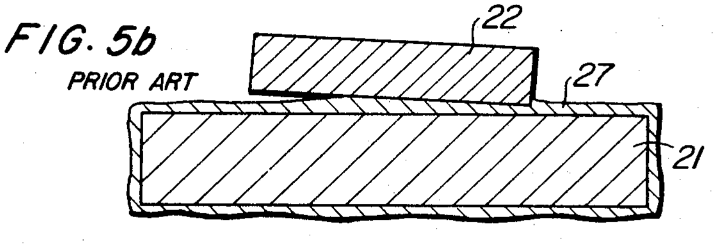
FIG. 5b PRIOR ART

FIGS. 5*a* and 5*b* are enlarged rough cross sectional views showing the main portions of the device according to this invention and of the device according to the prior art, respectively.

Figure 6:
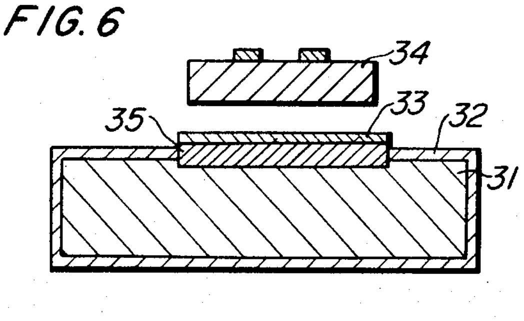

FIG. 6 shows a cross sectional view of a collector lead body according to another embodiment of this invention.

A brief explanation of a prior art device will be made hereunder.

The element in which a semiconductor pellet 2 is connected to a lead la as shown in FIGS. 1*a* and 1*b* is known as a high frequency semiconductor device. The lead 1*a* is generally made of iron plated with gold 6*a*, to one surface of which the silicon pellet 2 is connected making use of the gold-silicon eutectic. The element shown in these figures is a miniaturized transistor, the leads 1*a*, 1*b* and 1*c* being collector, base and emitter leads respectively. The wires 3 and 4 are base and emitter connector wires led out from the base and emitter electrodes towards their respective leads. The element is covered with a suitable region 5 in the dotted and shaded portions to be protected from the external atmosphere.

When the prior art device thus constituted is seen from points of the original cost and characteristics, the following shortcomings are recognized. First the leads 1a, 1b and 1c are covered with gold layers 6a, 6b, 6c on the entire surfaces so that the cost becomes high. Next although it is desired that the plating layer be uniform in quality and thickness on its whole surface, the gold plating is liable to become irregular as it is done relatively thinly (2.5–3.0 $\mu$) considering the cost. So, the pellet is raised partially away from the leads as shown in FIG. 5*b* (i.e., the floating of a pellet). Further, since the gold plating is made on the whole surface of the lead surface without regard to the position of pellet connection, the pellet is rarely connected to the center portion of the lead surface. Occasionally, in an extreme case, more than half of the pellet is pressed out externally from the side face of the lead. In such a case the bottom surface of pellet does not make a perfect contact with the lead surface. The mechanical strength is bad, and good ohmic contact is rarely obtained. Undesired influences affect the electrical characteristics. In particular, the bad contact at the collector portion increases the series resistance there and hence the collector saturation voltage $V_{CE}$(sat). The fact that the position of the pellet with respect to the leads is not uniformly defined is unfavorable for the positional alignment between the micro electrodes of base and emitter, etc. on the element and their respective connectors.

A description will be made hereinafter of the preferred embodiments of this invention, where some of the above-mentioned disadvantages will be overcome by the inventive simple method.

Figures 2A, 2B, 2C, 2D:
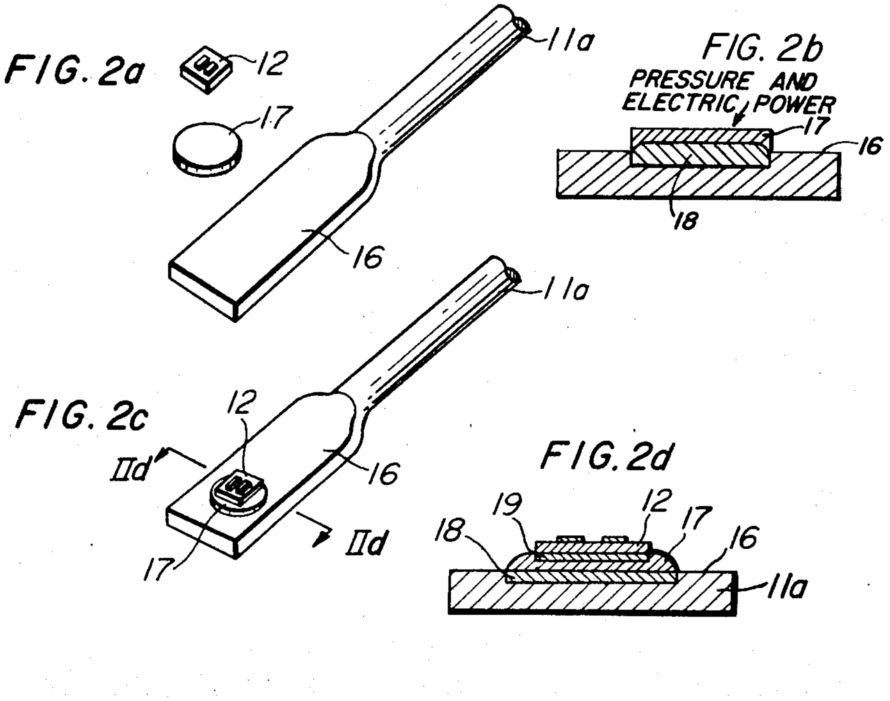

FIGS. 2*a* to 2*d* show the order of manufacturing steps of a semiconductor device according to this invention. FIG. 2*a* shows the disposition of the components for constructing a transistor. The lead 11*a* is a collector lead, preferably made of nickel or Ni-Fe alloy. A flat surface 16 with the dimensions of 1.5 mm × 0.8 mm is formed by pressure molding. The part 17 is a metal foil for the contact plate mainly made of gold, for example, in this embodiment Au-Sb alloy containing 0.07 percent by weight of antimony. The shape of the metal foil may be circular, square and angular. In this embodiment it is a disc with 0.5 mm in diameter and 0.025 mm in thickness. The part 12 is an N type silicon pellet with the dimensions 0.4 mm × 0.4 mm × 0.2 mm containing an NPN planar transistor. The metal foil 17 is disposed on the flat surface 16 of the lead 11*a* and welded thereon by a spot welder applying a pressure of 100 g. weight and an electric power of 3 watt. sec., as shown in FIG. 2*b*.

The metal foil 17 is firmly connected with the lead 11*a* by way of an alloy layer 18 formed therebetween during the spot welding step. The thickness of the alloy layer 18 between the foil 17 and the lead 11*a*, which is not illustrated to scale in FIG. 2*b*, can be easily controlled by pressure and electric power. Next, while the lead 11*a* with the foil 17 is heated to a temperature of about 400° C., the silicon pellet 12 is disposed on the surface of the metal plate 17 to connect the Au-Sb foil with the silicon pellet with the aid of gold-silicon eutectic. Thus the structure as shown in FIGS. 2*c* and 2*d* is obtained. FIG. 2*d* shows the cross section along the line II*d*—11*d* in FIG. 2*c*. The layer 18 is an Ni-Au-Sb alloy layer formed on the surface of nickel lead 11*a*, and the layer 19 is an Au-Si eutectic alloy layer. Although in FIG. 2*d* the Au-Sb layer 17 is left between the layers 13 and 19, it is not always the case. It is inferred that all of the remaining Au-Sb foil contributes to the formation of the eutectic alloy layer 19.

FIGS. 3*a* and 3*b* show the completed semiconductor device of this invention to be compared with a prior art one shown in FIGS. 1*a* and 1*b*. According to this invention the three slender leads are not applied by gold plating. The base and emitter connector wires 13 and 14 are connected by welding to the base and emitter leads 11*b* and 11*c* respectively. On the other hand in the prior art device as shown in FIGS. 1*a* and 1*b*, all the leads require the gold plating, and the connection of the base and emitter connectors 13 and 14 is done by thermocompression bonding so that the strength of the connection is unstable. In this invention since the connection is extraordinarily strengthened by welding, the accident of a connector breaking seldom occurs.

FIGS. 4*a* and 4*b* show the results of comparison between the electrical characteristics of the prior art transistor and the transistor according to the above embodiment, the abscissa being the collector saturation voltage ($V_{CE}$(sat)) and the ordinate being the number of transistors. The measurements are done under the condition of $I_C = 10$ mA and $I_B = 1$ mA. It is seen that $V_{CE}$(sat) of the prior art devices is scattered as shown in FIG. 4*a* while that of the inventive ones is within a constant range. Furthermore, the inventive products have an extremely reduced saturation voltage, which means a decrease in the collector series resistance. Therefore, the element can operate even at a low voltage, and the collector consuming power is small. Hence, the application range of the device is enlarged.

According to this invention since the metal plate 17 is connected by welding with the flat surface 16 of lead, its position is defined. Consequently, the connecting position of the pellet becomes also defined.

FIGS. 5*a* and 5*b* show cross sectional views showing the connecting work of pellet. When the contact portion between the silicon pellet 22 and the portion of the Au-Sb alloy plate 27 which is left unalloyed with the metal material 21, begins to fuse, the Au-Sb-Si eutectic is formed and the pellet 22 is gradually buried in the alloy plate 27 as shown in FIG. 5*a*. In this case rubbing is done so that the eutectic is formed uniformly on the whole surface of pellet 22. Thus, at about 400° C. the remaining Au-Sb plate 27 is substantially alloyed with silicon. One surface of the pellet 22 is almost entirely alloyed with the foil, making an ohmic contact. The Au-Sb plate 27 is firmly welded on the lead surface without spreading thereover. The surface tension between the Au-Sb alloy foil 27 and the silicon pellet 22 during the fusing time acts to bring and fix the pellet in the center portion of the foil. Hence, a shift of the position of the pellet can be easily corrected. The Au-Sb foil 27 is mechanically fitted to a prescribed position of the flat portion of lead 21. Therefore, the pellet 22 can be always connected to the prescribed position. In contrast thereto, as shown in FIG. 5 *b*, the gold plating 27 over the whole surface of the lead 21 which exists in the prior art device is apt to shift the pellet 22 during the connection and makes it difficult to fit it to a prescribed position. Due to the small thickness (2.5 $\mu$–3.0 $\mu$) of the gold plate 27, the entire bottom surface of pellet 22 is hard to alloy with the gold plating 27. The pellet 22 is only locally alloyed, the remaining portion floating as shown in FIG. 5*b*. Hence, the desired low ohmic contact is not obtained.

This invention has another advantage from the industrial point of view. Namely, except the lead 11*a* for connecting the pellet 12, other leads such as the base and emitter leads 11*b* and 11*c* do not require gold plating as shown in FIGS. 3*a* and 3*b*. While in the prior art device the connector wires 3 and 4 are connected to the leads by thermocompression bonding, as shown in FIGS. 1*a* and 1*b*, in this invention they are connected directly by welding. Three leads 11*a*, 11*b*, and 11*c*, may be made of the same material with the same shape, e.g., nickel leads. Therefore, this invention is superior to the prior method as regards cost and electrical characteristic. The cost of a lead body can be decreased to a half or a third of that in the conventional one.

As described above, since the connecting position of the connector can be defined, it is possible to apply automation to the steps of fitting pellets and connectors.

Although in the case of a silicon pellet, in particular an N type silicon pellet, the metal contact plate is generally made of a foil containing mainly gold, preferably an Au-Sb foil, as shown in this embodiment, it is not limited thereto. It is confirmed that a good result can be obtained when gold is used instead of Au-Sb alloy. It is needless to add that an advantage of using a foil or a contact plate is that a donor or acceptor impurity can be contained therein to obtain good ohmic contact. This invention has found that a good result is obtained when the leads are made of nickel. Since nickel is welded easily and well, and requires neither coating nor plating, the original cost can be lowered. The nickel lead has another advantage, a larger heat conductivity than that of Fe-Ni alloy plated by gold. Hence, the heat dissipation is promoted. This is an important merit in an element, e.g., a resin mold type one, having bad heat dissipation.

It is preferable that the metal plate possesses the property of forming good eutectic alloy with silicon at a low temperature as gold. The plate should not fuse and flow to the lead surface during the fitting of pellet.

FIG. 6 shows a cross sectional view of a collector lead body according to another embodiment of this invention, which differs from the foregoing embodiment in that a thin gold layer 32 with a thickness of 0.1 to 0.5 $\mu$ is formed on the surface of the collector lead 31 so that the lead possesses a good solderability in connecting with other circuit elements. An Au-Sb alloy foil 33 is connected to a nickel lead 31 by resistance welding portion of the gold layer 32 to form an Au-Sb-Ni alloy layer 35, and a silicon pellet 34 containing transistors is fused to the surface portion of the alloy foil 33 which is not welded to the lead 31. This collector body as well as the collector lead is used for the manufacture of a resin mold transistor together with base and emitter leads (not shown) which are applied by silver and/or gold plating. In this case, the connection of emitter and base leads with the emitter and base connectors is made by thermocompression bonding. It is needless to say that the latter embodiment has the same effect with that of the foregoing embodiment.

What is claimed is:

1. A semiconductor device comprising a metal lead of nickel-iron alloy, a metal foil of gold and antimony provided on the metal lead with a first intermediate metal layer of gold-nickel-antimony alloy formed on the side of said foil facing said metal lead, an N type silicon semiconductor pellet fixed to the opposite side of the metal foil by a second intermediate metal layer of a gold-silicon alloy distinct from said first intermediate layer and disposed between said first intermediate layer and said pellet.

2. A semiconductor device comprising a metal lead, a metal contact plate having first and second principal surfaces on said metal lead such that the first principal surface of the contact plate faces the surface of said metal lead, said contact plate having a region consisting principally of gold at least at the second principal surface thereof, said contact plate being connected at the first principal surface thereof with said metal lead by way of a first intermediate alloy layer essentially consisting of the alloy of said metal lead and of said contact plate, and a semiconductor pellet on the second principal surface of said contact plate and connected with said second principal surface by a second intermediate alloy layer formed from the metal of said region and the material of said pellet, said second intermediate alloy layer being distinct from said first intermediate alloy layer and being disposed between said pellet and said first intermediate alloy layer.

3. A semiconductor device according to claim 2, wherein said region essentially consists of gold and antimony.

4. A semiconductor device according to claim 3, wherein the pellet material is silicon and the second intermediate alloy layer essentially consists of a gold-silicon alloy.

5. A semiconductor device according to claim 4, wherein said metal lead includes nickel at least as a major component.

6. A semiconductor device according to claim 2, wherein the pellet material is silicon and the second intermediate alloy layer essentially consists of a gold-silicon alloy.

7. A semiconductor device according to claim 2, wherein the pellet material is silicon and the second intermediate alloy layer essentially consists of a gold-silicon alloy, said second intermediate alloy layer being separated from said first intermediate alloy layer by the remainder of said region consisting principally of gold.

* * * * *